(No Model.)
J. Q. BLACK.
HORSE COLLAR.
No. 263,842. Patented Sept. 5, 1882.
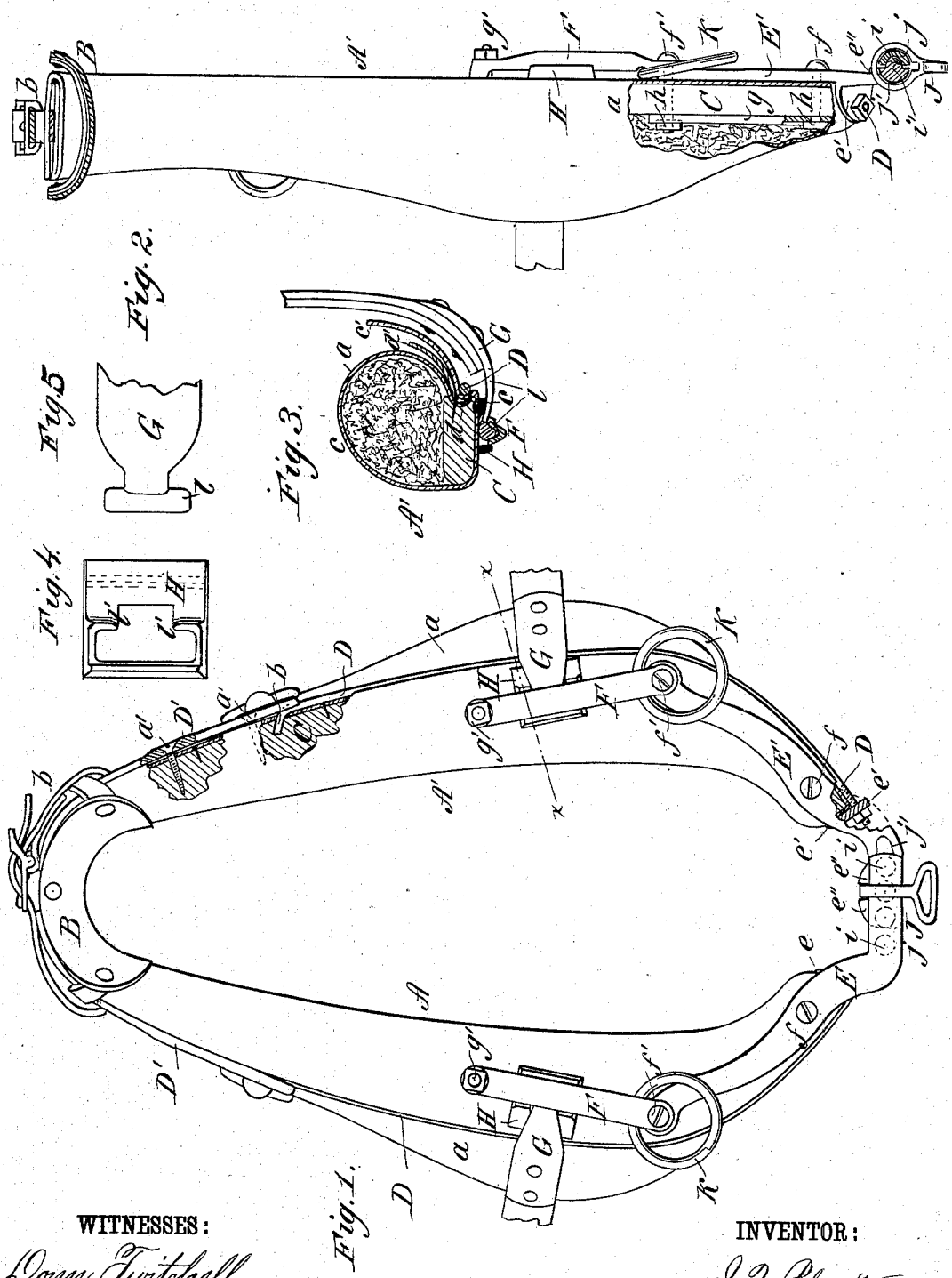
WITNESSES:
Donn Twitchell
C. Sedgwick
INVENTOR:
J. Q. Black
BY Munn & Co
ATTORNEYS.

UNITED STATES PATENT OFFICE.

JOHN Q. BLACK, OF LONE ROCK, WISCONSIN.

HORSE-COLLAR.

SPECIFICATION forming part of Letters Patent No. 263,842, dated September 5, 1882.

Application filed June 26, 1882. (No model.)

*To all whom it may concern:*

Be it known that I, JOHN Q. BLACK, of Lone Rock, in the county of Richland and State of Wisconsin, have invented a new and useful Improvement in Horse-Collars, of which the following is a full, clear, and exact description.

This invention relates to certain improvements in my new and improved horse-collar shown and described in Letters Patent No. 220,013, which were granted to me September 30, 1879, and has for its object to simplify the method of making the collar and to render the collar more convenient to handle and easier for the horse.

Reference is to be had to the accompanying drawings, forming part of this specification, in which similar letters of reference indicate corresponding parts in all the figures.

Figure 1 is a front elevation of my new and improved horse-collar, parts of the collar being broken away to show the construction. Fig. 2 is a broken elevation, showing the inside of one of the sides or parts of the collar. Fig. 3 is a sectional elevation taken on the line $x$ $x$ of Fig. 1. Fig. 4 is a plan view of the sliding plate, and Fig. 5 is a detail view of one of the tug-irons.

A A' represent the two members of the collar, which are secured together at their upper ends by the strap $b$, the neck-protector B being first fitted upon the ends of the said members, as shown in Fig. 1, to protect the neck of the horse. These members A A' are duplicates of each other, and are each formed of the stuffed cover $a$, of leather, and the wooden hame C, inclosed in the cover, as shown in Figs. 2 and 3.

E E' are the lower coupling-irons, which are secured to the members before they are completed by the bolts $f$ $f'$, which pass through the irons, the front part of the cover $a$, the hames, and the plates $g$, and receive the nuts $h$ $h$ upon their inner ends, as shown in Fig. 2. The coupling-iron E is formed with the perforated inward projection or step, $e$, and with the horizontal overlapping portion $j$, which is formed with the series of cups or depressions $i$ $i$ upon its inside, as indicated in Figs. 1 and 2. The coupling-iron E' is formed with the step $e'$ and the horizontal portion $j'$, and is a duplicate of the iron E, except that the horizontal portion is formed with the knob $i'$ to fit in the depressions $i$, and with the upward projections $e''$ $e''$ for retaining the clasp or ring J, which slips over the overlapping horizontal parts of the irons and locks them together and secures the collar upon the neck of the horse, as will be clearly understood from Figs. 1 and 2.

F F are the tug-plates which hold the T-headed tug-irons G G, the sliding plates H H, and the breast-strap rings K K. These irons, plates, and rings are put in place and attached to the collar at the same time the coupling-irons E or E' are attached, and the bolts or screws $f'$, which secure the upper ends of the coupling-irons, secure also the lower ends of the tug-plates F, as shown. The upper ends of the plates F are secured by the bolts $g'$, which pass through the hame, preferably from the inside outward, to receive the nut from the outside, as will be understood from the drawings. The plates F F are V-shaped in cross-section, and the heads $l$ of the tug-irons G G are formed to correspond, as shown in Fig. 3, so that the irons G will be securely held by the plates H and F. The plates H H are cut out so as to form the shoulders $l'$ $l'$, as shown in Fig. 5, to receive and hold the heads $l$ $l$ of the tug-irons, and these plates serve also to protect the cover $a$ of the collar from being worn from the movement of the tug-irons. By the use of these tug-irons, held in this manner, the tug is easily attached to the collar, and will automatically assume the position easiest for the horse, and will change with the change of the draft of the load, thus making the collar always easy for the horse and obviating altogether all danger of the collar chafing the horse's shoulders or neck.

The coupling-irons E E', as constructed, are very convenient in attaching and detaching the lower ends of the members of the collar, and this coupling is also very reliable, durable, and cheap.

Having thus described my invention, I claim as new and desire to secure by Letters Patent—

1. The collar herein shown and described, provided with the coupling-irons E E', having perforated lugs $e$ $e'$, in combination with the straining-rods D and screws $f$ $f'$ for holding the coupling-irons to the collar, as shown and described.

2. The combination, with the tug-plates F, grooved on their under sides and secured to the combined hame and collar by means of the screws $f'$ and bolts $g'$, of the sliding plate H and T-headed tug-irons, as shown and described.

3. The straining-rods D, formed with the hooks $b$, in combination with the overlapping irons D' and the coupling-irons formed with the perforated steps, substantially as and for the purposes set forth.

4. The plates F, made V-shaped in cross-section, and the tug-irons G, having the V-shaped heads $l$, in combination with the plates H, formed with the shoulders $l'$ $l'$, substantially as and for the purposes described.

JOHN Q. BLACK.

Witnesses:
FRED. H. TUTTLE,
F. W. BURNHAM.